Patented Nov. 10, 1942

2,301,669

UNITED STATES PATENT OFFICE 2,301,669

PROCESS FOR FREEING WATER FROM SALTS

Adolf Richter, Dessau in Anhalt, Germany; vested in the Alien Property Custodian No Drawing. Application December 29, 1938, Serial No. 248,180. In Germany January 5, 1938

3 Claims. (Cl. 210—24)

The present invention relates to a process for freeing water from salts and a suitable aggregate for this purpose. Specific details may be seen from the specification following hereafter.

It is known that natural water may be freed to a large extent from its electrolyte contents by filtration over cation and anion exchange bodies. The water from which the salt shall be soaked out is generally first filtered over a cation exchange body which has been regenerated by means of an acid and acts as hydrogen-ion exchange body, the cation contained in the water such as $Ca''$, $Mg''$, $Na'$ or the like being replaced by $H'$. The water thus freed from its base and rendered acid is subsequently filtered over an anion exchange body which has been pre-treated with a lye, for instance, caustic soda solution. The acid anions contained in the water from which the base has been removed are exchanged for hydroxyl-ions which together with the H-ions from the first filter yield water.

The water coming from the hydroxyl-ion exchange body, has, however, not uniform pH-values which depend upon the time of filtration that is to say the charging degree of the filter aggregate, especially of the anion exchange body. When charging a freshly regenerated exchange body yielding hydroxyl-ions first those groups of the exchange bodies are saturated which are the most strongly basic and capable of splitting up neutral salts. The water which has been filtered and previously freed from the base, as far as it contains still small quantities of salt, being rendered alkaline beyond the neutral point. As a rule the anion exchange body freshly regenerated with lye contains residual quantities of free lye the complete removal of which would require an uneconomically large quantity of pre-softened washing water. On the other hand, towards the end of the filtering operation also the less strongly basic groups of the hydroxyl-ion exchange body are saturated which display their efficacy only in the feebly acid sphere. In this manner a displacement of the pH-values occurs pari passu with the progressive charging of the anion exchange body, the more so as the filtrates in view of their low contents of residual salt practically have no buffering.

The pH-differences which affect the applicability of the water freed from salt may be compensated by mixing the filtrates, however, the mixing and storing containers required therefor must often be very large-sized.

The present invention relates to a technically simple manner of soaking out salt from water which is obtained with an enhanced yield and a great uniformity by connecting in series one or several pairs of filters for removing the salt with a cation-exchange filter capable of yielding alkali-ions as well as hydrogen-ions. The filter replaces, according to the acid degree of the water freed from salt which has been applied, the alkali-ions by hydrogen-ions or the hydrogen-ions by alkali-ions and thus compensates the pH-values. By the change in the composition of the water applied in the course of the different chargings the filter is automatically brought to the state suitable in each case. If, for example, the filtrate of the hydroxyl-ion exchange filter towards the end of the filtering operation of the salt removing filter aggregates is acid, the cation-exchange body connected in series is charged with hydrogen-ions, alkali-ions being split off. The filter thus partly reversed is then able to neutralise the first alkaline runnings at the beginning of a new charging period, the filter being charged again with alkali-ions for the second half of the charging period. These procedures are repeated in succession.

Simultaneously these compensating filters remove the last traces of calcium-ions and magnesium-ions which may come into the water freed from salt in case, for instance, industrial caustic soda solution is used as regenerating agent. Thus, the application of filters connected in series has moreover the technical advantage that for the regeneration of the hydroxyl-ion exchange body no chemically pure caustic soda solution need be used. In such cases also the buffer-filter connected in series is practically exhausted after a certain number of chargings by the absorption of the salts that cause the hardness of water. The filter is regenerated by simultaneous or subsequent treatment with alkali salts, for instance, sodium chloride, and mineral acids, for instance, hydrochloric acid, in which case the filtrates from the hydrogen-ion exchange body or hydroxyl-ion exchange body, especially the washing liquors after the regeneration, may be used. In a corresponding manner there may be connected in series with the filter aggregate removing the salt an anion exchange filter which is capable of yielding hydroxyl as well as acid anions, for instance $SO_4$-ions.

The following examples illustrate the invention:

(1) Well water of the following composition:
230 mgms. CaO per liter (total hardness)
28 mgms. CaO per liter (carbonate hardness)
240 mg./l. of bound $SO_3$
60 mg./l. of bound Cl
pH=8.2 is passed over a series of filters connected in series as follows: The first filter contains 200 parts by volume of a resin exchanging cations regenerated by means of hydrochloric acid according to the copending U. S. A. application Ser. No. 152,784, the second filter contains 100 parts by volume of a resin exchanging anions regenerated by means of caustic soda solution according to U. S. A. application Ser. No. 172,766 and the third filter contains 30 parts by volume of a resin exchanging cations regenerated by means of an acid as well as by an alkali salt according to the copending U. S. A. application Ser. No. 152,784. 600 parts by volume of well water are passed through the filter system per hour.

From a series of charging a period of freeing from salt between two regenerations of filters 1 and 2 has been chosen by way of example. The changes in the composition of the water having passed the single filters may be seen from the following table:

is passed over three filters connected in series and charged as follows:

*1st filter.*—200 parts by volume of a resin exchanging cations which has been regenerated by means of hydrochloric acid according to the copending U. S. A. application Ser. No. 152,784.

*2nd filter.*—60 parts by volume of a resin exchanging anions which has been regenerated by means of caustic soda solution free from calcium and magnesium according to the copending U. S. A. application Ser. No. 172,766.

*3rd filter.*—40 parts by volume of a resin exchanging anions which has been freed from solu-

| | Filter 1 | | | Filter 2 | | | | | | Filter 3 | | | |
|---|---|---|---|---|---|---|---|---|---|---|---|---|---|
| Parts by volume | Mgms. CaO per liter | m-Value | pH | p-Value | m-Value | SO$_3$ mg./l. | Cl mg./l. | Mgms. CaO per liter | pH | p-Value | m-Value | Mgms. CaO per liter |
| 500 | 00.6 | −9.4 | 11 | 0.4 | 1.4 | 0 | 15 | 03.0 | 7.5 | 0 | 0.7 | 00.6 |
| 1000 | 00.6 | −9.3 | 10 | 0.2 | 1.2 | 0 | 8 | 02.5 | 7.5 | 0 | 0.65 | 00.6 |
| 2000 | 00.6 | −9.1 | 9 | 0 | 1.0 | 0 | 4 | 02.0 | 7 | 0 | 0.65 | 00.6 |
| 3000 | 00.6 | −8.8 | 9 | 0 | 0.8 | 0 | 3 | 01.0 | 7 | 0 | 0.65 | 00.6 |
| 4000 | 00.6 | −8.7 | 8 | 0 | 0.7 | 0 | 2 | 01.0 | 7 | 0 | 0.65 | 00.6 |
| 5000 | 00.6 | −8.5 | 7 | 0 | 0.6 | 0 | 2 | 00.6 | 7 | 0 | 0.65 | 00.6 |
| 6000 | 00.6 | −8.3 | 6 | 0 | 0.6 | 0 | 3 | 00.6 | 7 | 0 | 0.6 | 00.6 |
| 7000 | 00.6 | −8.1 | 5.5 | 0 | 0.5 | 0 | 6 | 00.6 | 7 | 0 | 0.6 | 00.6 |
| 8000 | 00.6 | −7.8 | 4.5 | 0 | 0.45 | 0 | 10 | 00.6 | 7 | 0 | 0.6 | 00.6 |

The p-values and the m-values, respectively, indicate the quantity of $\tfrac{1}{10}$ N-hydrochloric acid per 100 ccm. of water necessary for arriving at the point at which phenolphtaleine or methyl-orange change their colour. In case of a negative m-value (filter 1), $\tfrac{1}{10}$ N-caustic soda solution has been used for titration.

ble substances such as salts, acids and lyes by washing with water free from hardness according to the copending U. S. A. application Ser. No. 172,766.

The following table shows how the water has been freed from the salt between two regenerations of the second filter:

| | Filter 1 | | | Filter 2 | | | | | | Filter 3 | | | |
|---|---|---|---|---|---|---|---|---|---|---|---|---|---|
| Parts by volume | Mgms. CaO per liter | m-Value | pH | p-Value | m-Value | SO$_3$ mg./l. | Cl mg./l. | Mgms. CaO per liter | pH | p-Value | m-Value | Mgms. CaO per liter |
| 300 | 00.6 | −9.5 | 9.0 | 0.4 | 1.3 | 0 | 10 | 00.6 | 7.0 | 0 | 1.0 | 00.6 |
| 600 | 00.6 | −9.5 | 8.5 | 0.3 | 1.2 | 0 | 5 | 00.6 | 7.0 | 0 | 0.8 | 00.6 |
| 900 | 00.6 | −9.4 | 8.5 | 0.2 | 1.2 | 0 | 4 | 00.6 | 7.0 | 0 | 0.8 | 00.6 |
| 1200 | 00.6 | −9.4 | 8.0 | 0.2 | 1.1 | 0 | 3 | 00.6 | 7.0 | 0 | 0.7 | 00.6 |
| 1500 | 00.6 | −9.3 | 7.5 | 0.1 | 1.0 | 0 | 3 | 00.6 | 7.0 | 0 | 0.9 | 00.6 |
| 1800 | 00.6 | −9.2 | 7.5 | 0 | 1.0 | 0 | 2 | 00.6 | 7.0 | 0 | 0.8 | 00.6 |
| 2100 | 00.6 | −9.2 | 6.5 | 0 | 1.0 | 0 | 3 | 00.6 | 7.0 | 0 | 0.8 | 00.6 |
| 2400 | 00.6 | −9.1 | 5.5 | 0 | 0.8 | 0 | 10 | 00.6 | 7.0 | 0 | 0.8 | 00.6 |

When exhausted, filter 2 is regenerated with 200 parts by volume of a caustic soda solution of 4% strength and washed with further 1000 parts by volume of the filtrate from filter 1 which is still free from salts that cause the hardness of water. Thereupon filter 1 is regenerated by means of 200 parts by volume of hydrochloric acid of 5% strength and washed with hard well water. The filter system, including filter 3, is then set to work. The water which has passed through the filter has pH values between 7.5 and 7 and m-values between 0.7 and 0.6. After 15 charging operations filter 3 is regenerated by means of 40 parts by volume of sodium chloride solution of 5% strength in order to remove the salts causing hardness of water which have been taken up and, for the purpose of adjusting to an alkali-ion exchange body and a hydrogen-ion exchange body treated with 500 parts by volume of the first strongly acid washing water free from hardness.

(2) Well water of the following composition:

209 mgms. CaO per liter (total hardness)
30 mgms. CaO per liter (carbonate hardness)
320 mg./l. of bound SO$_3$
60 mg./l. of bound Cl
pH=8.1

A regeneration of the third filter does not occur since it is adjusted accordingly by the small quantities of lye present at the beginning of the filtering operation of filter 2 and the small quantities of acid present towards the end of the filtering operation of filter 2.

Of course the invention is not limited to the specific details described, for obvious modifications may occur to a person skilled in the art.

What I claim is:

1. The process of freeing water from salts which comprises passing the water successively through a hydrogen-ion exchange filter, an hydroxyl-ion exchange filter and an ion-exchanging filter containing a member of the group consisting of cation-exchanging materials capable of yielding alkali- and hydrogen-ions and anion-exchanging materials capable of yielding hydroxyl- and acid-ions, said hydrogen-ion exchange filter being periodically regenerated by treating with an acid and washing out the excess acid, said hydroxyl-ion exchange filter being periodically regenerated by treating with a solution of an alkali and washing out the excess alkali, said final ion exchanging filter being regenerated automatically by the ions still present in the water flowing therethrough.

2. The process of freeing water from salts which comprises passing the water successively through a hydrogen-ion exchange filter, an hydroxyl-ion exchange filter and an ion-exchanging filter containing a material capable of yielding alkali- and hydrogen-ions, said hydrogen-ion exchange filter being periodically regenerated by treating with an acid and washing out the excess acid, said hydroxyl-ion exchange filter being periodically regenerated by treating with a solution of an alkali and washing out the excess alkali, said final ion exchanging filter being regenerated automatically by the ions still present in the water flowing therethrough.

3. The process of freeing water from salts which comprises passing the water successively through a hydrogen-ion exchange filter, an hydroxyl-ion exchange filter and an ion-exchanging filter containing a material capable of yielding hydroxyl- and acid-ions, said hydrogen-ion exchange filter being periodically regenerated by treating with an acid and washing out the excess acid, said hydroxyl-ion exchange filter being periodically regenerated by treating with a solution of an alkali and washing out the excess alkali, said final ion exchanging filter being regenerated automatically by the ions still present in the water flowing therethrough.

ADOLF RICHTER.